(12) United States Patent
Pelletier et al.

(10) Patent No.: US 8,015,815 B2
(45) Date of Patent: Sep. 13, 2011

(54) FUEL INJECTOR NOZZLES, WITH LABYRINTH GROOVES, FOR GAS TURBINE ENGINES

(75) Inventors: Robert R. Pelletier, Chardon, OH (US);
Ravi Gudipati, Willoughby, OH (US);
Michael Carrel, Jefferson, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 585 days.

(21) Appl. No.: 12/105,770

(22) Filed: Apr. 18, 2008

(65) Prior Publication Data
US 2009/0044538 A1 Feb. 19, 2009

Related U.S. Application Data

(60) Provisional application No. 60/912,458, filed on Apr. 18, 2007.

(51) Int. Cl.
*F02C 1/00* (2006.01)
*F02G 3/00* (2006.01)

(52) U.S. Cl. ............... 60/740; 60/742; 60/748; 239/132

(58) Field of Classification Search ............ 60/740, 60/742, 746, 747, 748; 239/132, 533.2
See application file for complete search history.

(56) References Cited

U.S. PATENT DOCUMENTS

| | | | |
|---|---|---|---|
| 3,304,713 A | 2/1967 | Szydlowski | |
| 3,381,471 A | 5/1968 | Szydlowski | |
| 3,685,741 A * | 8/1972 | O'Sickey | 239/406 |
| 3,777,983 A * | 12/1973 | Hibbins | 239/422 |
| 3,788,067 A * | 1/1974 | Carlisle et al. | 60/742 |
| 4,350,009 A | 9/1982 | Holzapfel | |
| 4,554,789 A | 11/1985 | Napoli et al. | |
| 4,600,151 A * | 7/1986 | Bradley | 239/400 |
| 5,014,918 A * | 5/1991 | Halvorsen | 239/410 |
| 5,243,816 A | 9/1993 | Huddas | |
| 5,277,023 A | 1/1994 | Bradley et al. | |
| 5,288,021 A * | 2/1994 | Sood et al. | 239/132.5 |
| 5,329,760 A | 7/1994 | Bradley et al. | |
| 5,701,732 A | 12/1997 | Nesbitt et al. | |
| 5,713,205 A * | 2/1998 | Sciocchetti et al. | 60/740 |
| 5,735,115 A | 4/1998 | Maghon | |
| 5,737,921 A * | 4/1998 | Jones et al. | 60/740 |
| 5,761,907 A * | 6/1998 | Pelletier et al. | 60/740 |
| 5,826,423 A | 10/1998 | Lockyer et al. | |
| 6,076,356 A | 6/2000 | Pelletier | |
| 6,101,814 A * | 8/2000 | Hoke et al. | 60/752 |
| 6,276,141 B1 | 8/2001 | Pelletier | |
| 6,622,488 B2 * | 9/2003 | Mansour et al. | 60/740 |
| 6,823,677 B2 * | 11/2004 | Prociw et al. | 60/800 |
| 6,895,755 B2 * | 5/2005 | Steinthorsson et al. | 60/742 |
| 6,959,535 B2 | 11/2005 | Mancini et al. | |
| 2004/0139750 A1 * | 7/2004 | Bretz | 60/776 |
| 2010/0251720 A1 * | 10/2010 | Pelletier et al. | 60/740 |

FOREIGN PATENT DOCUMENTS

EP 0724115 7/1996

\* cited by examiner

*Primary Examiner* — William H Rodriguez
(74) *Attorney, Agent, or Firm* — Renner, Otto, Boisselle & Sklar, LLP

(57) ABSTRACT

A fuel injector for a gas turbine engine of an aircraft, and more particularly a novel and unique heatshield structure for a fuel nozzle wherein a labyrinth seal is uniquely provided in the nozzle to isolate a portion of an insulating gap from an interface whereat fuel may enter the insulating gap, and the insulating gap is provided with a positive purge flow for forcing vapors out of the insulating gap.

23 Claims, 8 Drawing Sheets

FUEL INJECTOR NOZZLES, WITH LABYRINTH GROOVES, FOR GAS TURBINE ENGINES

RELATED CASE

This application claims the benefit of the filing date of U.S. Provisional Application No. 60/912,458 filed Apr. 18, 2007, which is hereby incorporated herein by reference.

FIELD OF THE INVENTION

The present invention relates generally to injectors and nozzles for high temperature applications, and more particularly to fuel injectors and nozzles for gas turbine engines of aircraft.

BACKGROUND

Fuel injectors for gas turbine engines on an aircraft direct fuel from a manifold to a combustion chamber of a combustor. The fuel injector typically has an inlet fitting connected to the manifold for receiving the fuel, a fuel nozzle located within the combustor for spraying fuel into the combustion chamber, and a housing stem extending between and fluidly interconnecting the inlet fitting and the fuel nozzle. The housing stem typically has a mounting flange for attachment to the casing of the combustor.

Fuel injectors are usually heat-shielded because of a high operating temperatures arising from high temperature gas turbine compressor discharge air flowing around the housing stem and nozzle. The heat shielding prevents the fuel passing through the injector from breaking down into its constituent components (i.e., "coking"), which may occur when the wetted wall temperatures of a fuel passage exceed 400° F. The coke in the fuel passages of the fuel injector can build up to restrict fuel flow to the nozzle.

Heretofore, injector nozzles have included annular stagnant air or insulating gaps as insulation between external walls, such as those in thermal contact with high temperature ambient conditions, and internal walls in thermal contact with the fuel. In order to accommodate differential expansion of the internal and external walls while minimizing thermally induced stresses, the walls heretofore have been anchored at one end and free at the other end for relative movement. If the downstream tip ends of the walls are the ends left free for relative movement, even a close fitting sliding interface between the downstream tip ends can allow fuel to pass into the air gap formed between the walls. This can result in carbon being formed in the air gap, which carbon is not as good an insulator as air. In addition, the carbon may build up to a point where it blocks venting of the air gap to the air gap in the stem, which can lead to an accumulation of fuel in the air gap. This can lead to diminished nozzle service life.

SUMMARY OF THE INVENTION

The present invention provides, inter alia, a novel and unique fuel injector for a gas turbine engine of an aircraft, and more particularly a novel and unique heatshield structure for a fuel nozzle. In accordance with the invention, a labyrinth seal is uniquely provided in the nozzle to isolate a portion of an insulating gap from an interface whereat fuel may enter the insulating gap. Additionally, the insulating gap is provided with a positive purge flow for forcing vapors out of the insulating gap. Although the invention is particularly applicable to fuel injectors and nozzles for gas turbine engines, principles of the invention also are more generally applicable to other applications, particularly high temperature applications where insulating gaps are provided in the nozzle and into which an ambient fluid may enter through an interface between relatively moving parts of the nozzle.

As is preferred, the labyrinth seal is formed by labyrinth grooves in an unrestrained tip region of the nozzle to trap fuel (or other vapors depending on the application) as they enter and prevent fuel from moving further upstream into the insulating gap. In combination with the grooves, venting is added upstream to set up a favorable pressure differential to purge any fuel emanating from the grooves out of the fuel nozzle.

The shape, number and/or location of the grooves can vary. The venting for purging can also vary according to shape, number and location for favorable pressure drop, depending on the application.

Accordingly, a nozzle comprises an inlet at an upstream end of the nozzle, a discharge outlet at a downstream end of the nozzle, and a fluid delivery passage extending between the inlet and the discharge outlet. An internal annular wall bounds one side of the fluid delivery passage along a length thereof, whereby such wall is in heat transfer relation with fluid passing through the fluid delivery passage. An external annular wall is interposed between the internal annular wall and ambient conditions surrounding the nozzle, and the external and internal walls have downstream tip ends that are relatively longitudinally movable at an interface, as may arise from relative thermal growth during use of the nozzle under high temperature conditions. Additionally, an internal insulating gap is interposed between the internal and external walls to insulate the internal wall from ambient temperature conditions external to the nozzle. One of the internal and external walls has formed therein, proximate the downstream tip ends thereof, at least one labyrinth groove opening toward the other one of the internal and external walls for capturing ambient fluid that may enter into the insulating gap through the interface.

As is preferred, the nozzle further comprises at least one vent opening communicating with the insulating gap at an upstream end of the nozzle for providing a purge flow from the vent opening toward the interface. The vent opening may fluidly connect to a central through duct that extends axially through the nozzle and which is surrounded by the internal wall.

The nozzle may be further characterized by one or more of the following features:

a. the fluid delivery passage may include at least one vane configured to impart swirling to the fluid flowing to the discharge outlet;

b. the insulating gap may surround the internal wall and the external wall may surround the insulating gap;

c. the internal wall may surround the insulating gap, and the insulating gap may surround a central duct extending axially through the nozzle;

d. the central duct may include swirl vanes for imparting a rotary motion to an ambient fluid flowing through the central duct;

e. the insulating gap may contain air, another gas or an insulating material, or may be evacuated; and/or f. the insulating gap may extend substantially the entire length of the fluid delivery passage.

According to another aspect of the invention, a fuel injector for a gas turbine engine comprises a nozzle as above described for spraying fuel into a combustion chamber, and a housing stem for supporting the nozzle in the combustion chamber. The housing stem includes an internal fuel conduit for supplying fuel to the fluid inlet of the nozzle.

The fuel injector may be further characterized by one or more of the following features:

a. the housing stem may include an external wall surrounding the fuel conduit, and an insulating gap between the external wall and fuel conduit, which insulating gap may be in fluid communication with the insulating gap of the nozzle;

b. the insulating gap may contain air, another gas or an insulating material, or may be evacuated;

c. the housing stem may extend from a fuel line fitting to the nozzle for connecting the nozzle to the fitting;

d. the housing stem and nozzle may be rigidly and fixedly connected together as a single component that can be inserted into and located within an opening in a combustor casing; and/or e. the housing stem may include a flange extending outwardly away from the stem, the flange having an attachment device to allow the stem to be attached to the gas turbine engine.

According to a further aspect of the invention, a fuel injector for a gas turbine engine comprises a housing stem and a nozzle, the nozzle including an internal wall in heat transfer relation with fuel flowing through the nozzle, and an external wall in heat transfer relation with ambient air. The internal and external walls have downstream tip ends that are relatively moveable at an interface due to relative thermal growth during operation of the engine. An internal insulating gap is disposed between the internal and external walls to provide a heat shield for the internal wall, and one of the internal and external walls has formed therein, proximate the downstream tip ends thereof, at least one labyrinth groove opening toward the other one of the internal and external walls for capturing ambient fluid that may enter into the insulating gap through the interface.

According to still another aspect of the invention, a fuel injector for a gas turbine engine comprises a fitting having a first fuel passage for receiving fuel; a nozzle having a second fuel passage for dispensing fuel; a housing stem extending between and interconnecting said fitting and said nozzle for i) supporting said fuel nozzle, and ii) directing fuel flow from said fitting to said nozzle, said housing stem having an internal bore defined by internal walls extending longitudinally through the stem; and a fuel conduit disposed in the bore in said housing stem and closely surrounded by the internal walls of said housing stem. The fluid conduit has a first connection with the fitting and a second connection with the nozzle to fluidly interconnect the fuel passage in said fitting with the fuel passage in said nozzle, the internal bore in the housing stem is fluidly closed at the first connection to prevent fuel flowing around the fuel conduit in the bore, and the fuel conduit is spaced apart from the internal walls of the housing stem such that an air gap surrounds the fuel conduit along substantially the entire length of the fuel conduit between the fuel conduit and the housing stem. A vent passage internal of the nozzle has a first, upstream end fluidly connected to the air gap, and a second end at a downstream end of the nozzle. The vent passage is formed by co-axial cylindrical vent conduits, with one residing within the other and a labyrinth groove structure defined between the vent conduits forming at least a portion of the vent passage. A vent hole into the vent passage is provided for creating a pressure differential between the upstream end of the vent passage and the downstream end of the vent passage.

Other features and advantages of the present invention will become further apparent upon reviewing the following detailed description and attached drawings.

DETAILED DESCRIPTION

Figure 1:
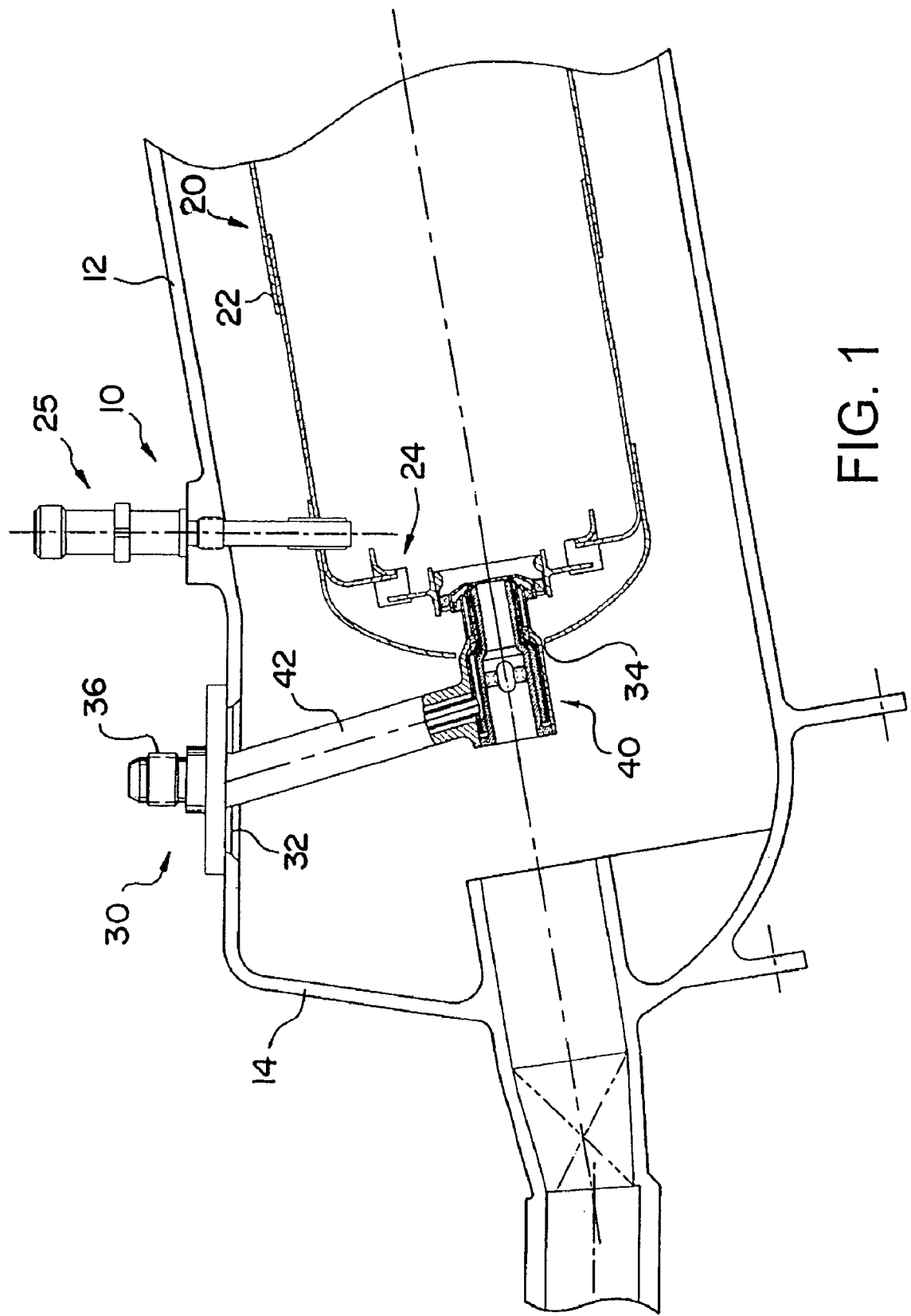
FIG. 1 is a partial cross-sectional view of a portion of a gas turbine engine illustrating a fuel injector constructed in accordance with the present invention.

As above indicated, the principles of the present invention have particular application to fuel injectors and nozzles for gas turbine engines and thus will be described below chiefly in this context. It will of course be appreciated, and also understood, that the principles of the invention may be useful in other applications including, in particular, other fuel nozzle applications and more generally applications where a fluid is injected by a nozzle especially under high temperature conditions. In addition, an air blast type nozzle/injector is illustrated in the drawings, but the principles of the invention may be applied to other types of nozzles and injectors, such as pressure atomizer, multiple fuel circuit nozzles with one or more inlets or fuel conduits, etc. Such other nozzles/injectors may or may not have the illustrated central duct.

Referring now in detail to the drawings and initially to FIG. 1, a gas turbine engine for an aircraft is illustrated generally at 10. The gas turbine engine 10 includes an outer casing 12 extending forwardly of an air diffuser 14. The casing and diffuser enclose a combustor, indicated generally at 20, for containment of burning fuel. The combustor 20 includes a liner 22 and a combustor dome, indicated generally at 24. An igniter, indicated generally at 25, is mounted to the casing 12 and extends inwardly into the combustor for igniting fuel. The above components can be conventional in the art and their manufacture and fabrication are well known.

A fuel injector, indicated generally at 30, is received within an aperture 32 formed in the engine casing 12 and extends inwardly through an aperture 34 in the combustor liner 22. The fuel injector 30 includes a fitting 36 external of the engine casing for receiving fuel, as by connection to a fuel manifold or line; a fuel nozzle, indicated generally at 40, disposed within the combustor for dispensing fuel; and a housing stem 42 interconnecting and structurally supporting the nozzle 40 with respect to fitting 36. The fuel injector is suitably secured to the engine casing, as by means of an annular flange 41 that may be formed in one piece with the housing stem 42 proximate the fitting 36. The flange extends radially outward from the housing stem and includes appropriate means, such as apertures, to allow the flange to be easily and securely connected to, and disconnected from, the casing of the engine using, as by bolts or rivets.

Figure 2:
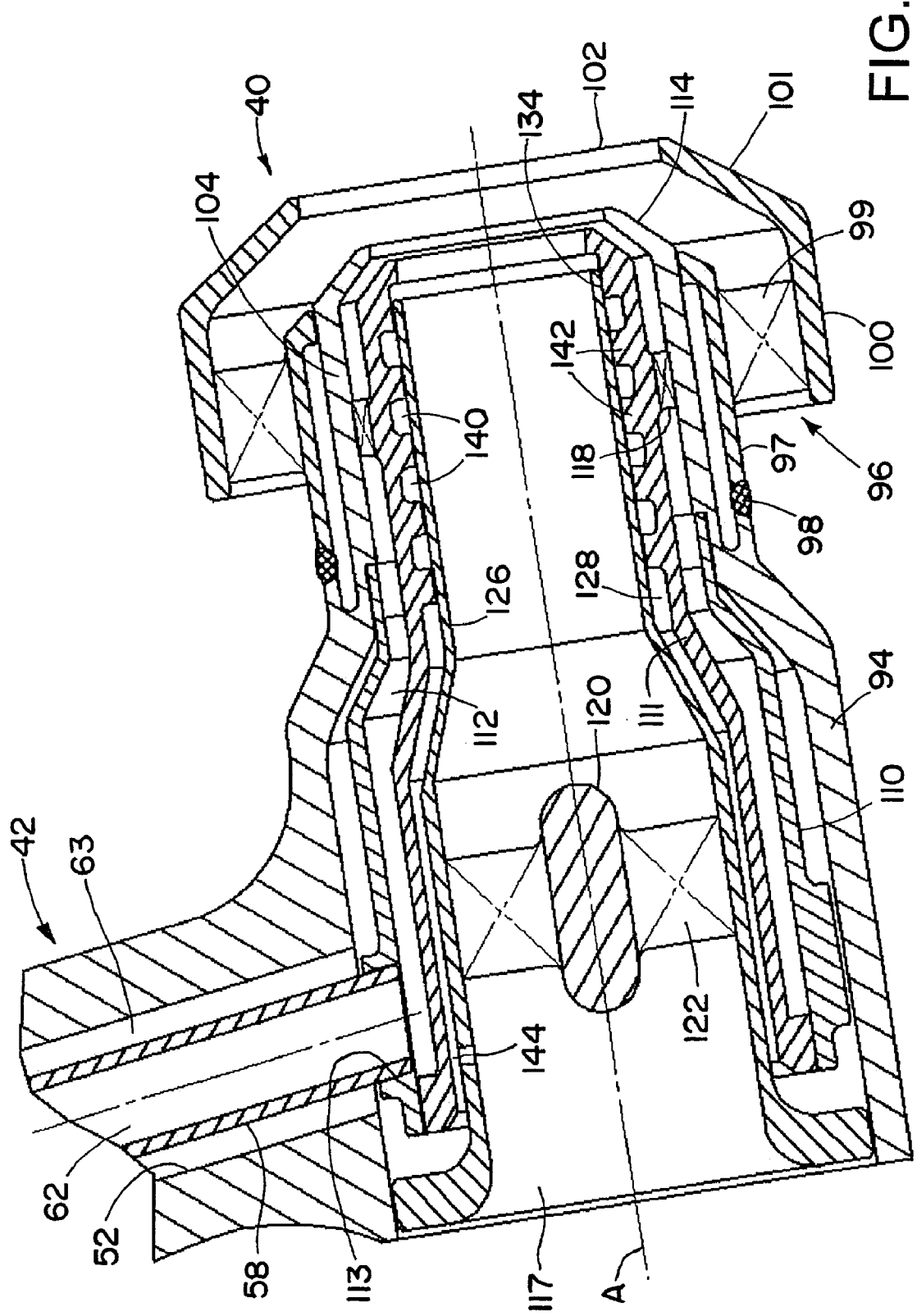
FIG. 2 is a fragmentary cross-sectional view of a portion of the injector nozzle, showing one configuration of a labyrinth seal and purge venting.

As best seen in FIG. 2 when viewed in conjunction with FIG. 1, the housing stem 42 includes a central, longitudinally-extending bore 52 extending the length of the housing stem. A fuel conduit 58 extends through the bore and fluidly interconnects fitting 36 and nozzle 40. The fuel conduit 58 has an internal passage 62 for the passage of fuel. The fuel conduit 58 is surrounded by the bore 52 of the housing stem, and an annular insulating gap 63 is provided between the external surface of the fuel conduit 58 and the walls of the bore 52. The insulating gap 63 provides thermal protection for the fuel in the fuel conduit. The housing stem 42 has a thickness sufficient to support nozzle 40 in the combustor when the injector is mounted to the engine, and is formed of material appropriate for the particular application.

The housing stem 42 may be formed integrally with fuel nozzle 40, and preferably in one piece with at least a portion of the nozzle. The lower end of the housing stem includes an annular outer shroud 94 circumscribing the longitudinal axis "A" of the nozzle 40. The outer shroud 94 is connected at its downstream end to an annular outer air swirler 96, such as by welding at 98. The outer air swirler 96 includes an annular wall 97 forming a continuation of the shroud 94 and from which swirler vanes 99 may project radially outwardly to an annular shroud 100. The shroud 100 is tapered inwardly at its downstream end 101 to direct air in a swirling manner toward the central axis "A" at the discharge end 102 of the nozzle.

A second outer air swirler (not shown) may also be provided, in surrounding relation to the air swirler 96. The second air swirler may also include radially-outward projecting swirler vanes and an annular shroud. The outermost shroud may have a geometry at its downstream end that also directs air in a swirling manner toward the central axis "A" at the discharge end of the nozzle.

The annular wall 97 surrounds a downstream wall 104 of the shroud 100 that forms a continuation of an annular prefilmer 110 that is attached as by brazing to the upstream end of the prefilmer wall 104. The annular prefilmer 110 and prefilmer wall 104 surround a fuel swirler 111, and together the prefilmer, prefilmer wall and fuel swirler form internal walls of the nozzle that define therebetween a fuel passage 112, to direct fuel through the nozzle. The fuel swirler may be provided with vanes 118 that direct the fuel in a swirling manner as it flows past the vanes. The prefilmer 110 may have a fuel inlet opening 113 at its upstream end, that receives the downstream end of fuel conduit 58. The fuel conduit 58 may be fluidly sealed and rigidly and permanently attached within the opening in an appropriate manner, such as by welding or brazing. The prefilmer wall 104 may be tapered inwardly at its downstream end 114 to direct fuel in a swirling manner toward the central axis "A" at the discharge end 102 of the nozzle. An air swirler 120 with radially-extending swirler blades 122 may also be provided in an air passage (duct) 117 bounded by the radially inner surface of an inner annular heat shield 126 that is disposed radially inwardly of the fuel swirler as seen in FIG. 2. The air swirler 120 directs air in a swirling manner along the central axis "A" of the nozzle to the discharge end 102 of the nozzle.

The inner heat shield 126 extends centrally within the nozzle. The inner heat shield and fuel swirler respectively form external and internal walls of the nozzle that have an insulating gap 128 therebetween that functions to protect the fuel from the elevated temperatures. The insulating gap 128 may be connected by a suitable passage in the nozzle to the insulating gap 63 of the housing stem for venting, if desired.

In use, the inner heat shield 126 will be in thermal contact with ambient conditions external to the nozzle, such being for instance a high temperature gas, in particular high temperature gas turbine compressor discharge air that passes through duct 117 in the nozzle. Consequently, the inner heat shield will usually expand longitudinally (along the axis A) more than the fuel swirler 111 that is in thermal contact with the fuel and thus cooled by the fuel. To avoid high stresses from being induced in the nozzle, the inner heat shield and fuel swirler may have the upstream ends thereof anchored, i.e. fixed, with respect to one another, while the downstream tip ends thereof may be free to move relative to one another in the longitudinal direction, i.e. along the axis A of the nozzle.

To minimize the passage of fuel into the insulating gaps, the tip ends of the tip ends of the fuel swirler 111 and inner heat shield 126 may be provided with a close fitting sliding interface indicated at 134. Notwithstanding the close fit, fuel may still pass into the insulating gap 128 formed between the walls 111 and 126. This can result in carbon being formed in the insulating gap, which carbon is not as good an insulator as air. In addition, the carbon may build up to a point where it blocks venting of the insulation gap 126, and this can lead to an accumulation of fuel in the insulation gap. This may possibly lead to diminished nozzle service life.

Figure 8:
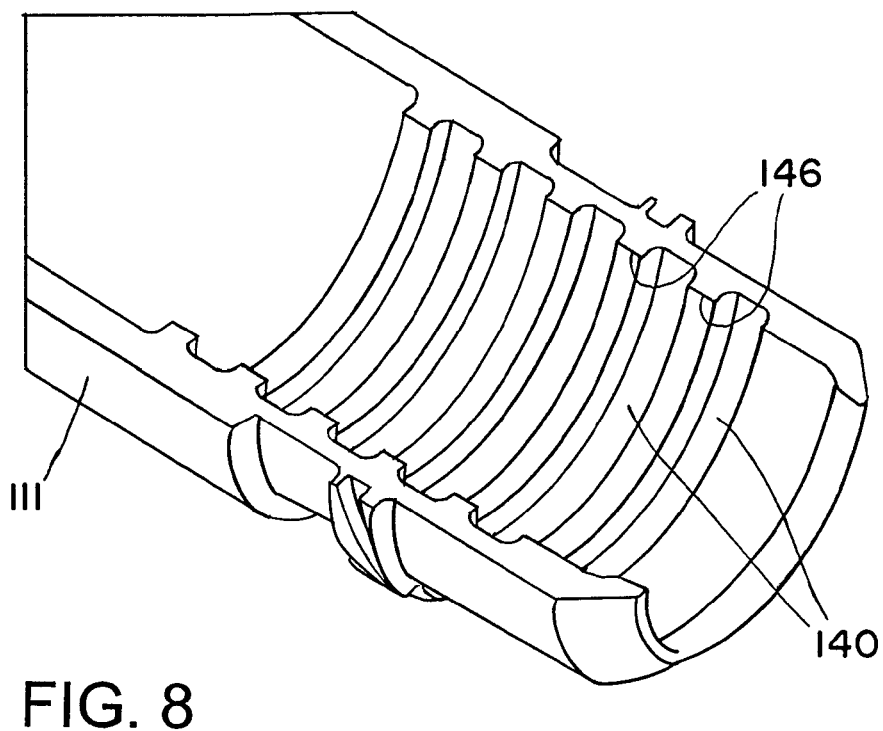
FIG. 8 is a fragmentary perspective view showing an exemplary arrangement of labyrinth grooves and threads provided on a fuel swirler.

In accordance with the present invention, the fuel swirler 111 has formed is its radially inner wall surface facing the heat shield 126 proximate the downstream tip end thereof (i.e. at the interface 134), at least one and preferably a plurality (four shown) of labyrinth grooves 140 that open toward the heat shield for capturing ambient fluid that may enter into the insulating gap 128 through the interface 134. The labyrinth grooves are axially spaced apart by annular threads 142 that engage the interior wall surface of the heat shield with a slip fit. Further details of the labyrinth grooves and threads are shown in FIG. 8, where only the fuel swirler is shown.

The labyrinth grooves 140 and threads 142 in effect form a labyrinth seal that performs a sealing action by controlling the passage of fluid through a plurality of chambers formed by the grooves. Fluid can become entrapped in the labyrinth chambers, where it may be forced into a vortex-like motion that acts to prevent its escape and also repel additional fluid from entering.

Additionally (or alternatively), the insulating gap 128 is provided with a positive purge flow for forcing vapors out of the insulating gap. To this end, at least one vent opening 144 is provided in the heat shield 126 at the upstream end thereof to communicate the upstream end of insulating gap with the central duct. This will set up a pressure drop between the vent opening and the downstream end of the interface 134 for producing a purge flow that forces vapors out of the insulating gap. Although only one vent opening is shown, a plurality of annularly spaced apart vent openings may be provided in the heat shield.

Figure 3:
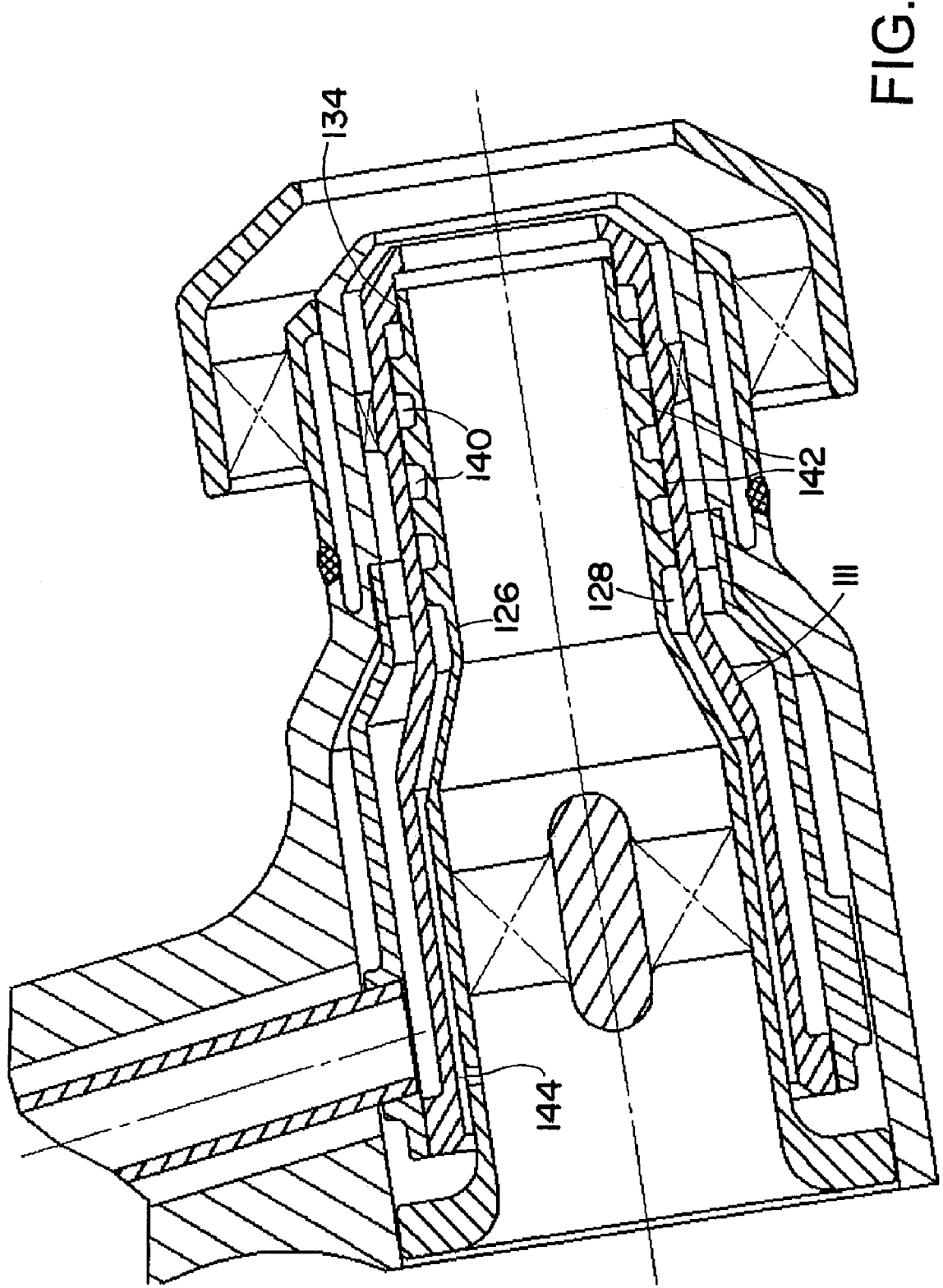
FIG. 3 is a fragmentary cross-sectional view similar to FIG. 2, but showing another configuration.

If desired, the labyrinth grooves 140 and threads 142 additionally or alternatively may be provided on the radially outer surface of the inner heat shield 126 as illustrated FIG. 3, wherein the same reference numerals are used to denote like components. In this version of the nozzle, the balance of the structure is otherwise identical to the nozzle shown in FIG. 2.

Figure 4:
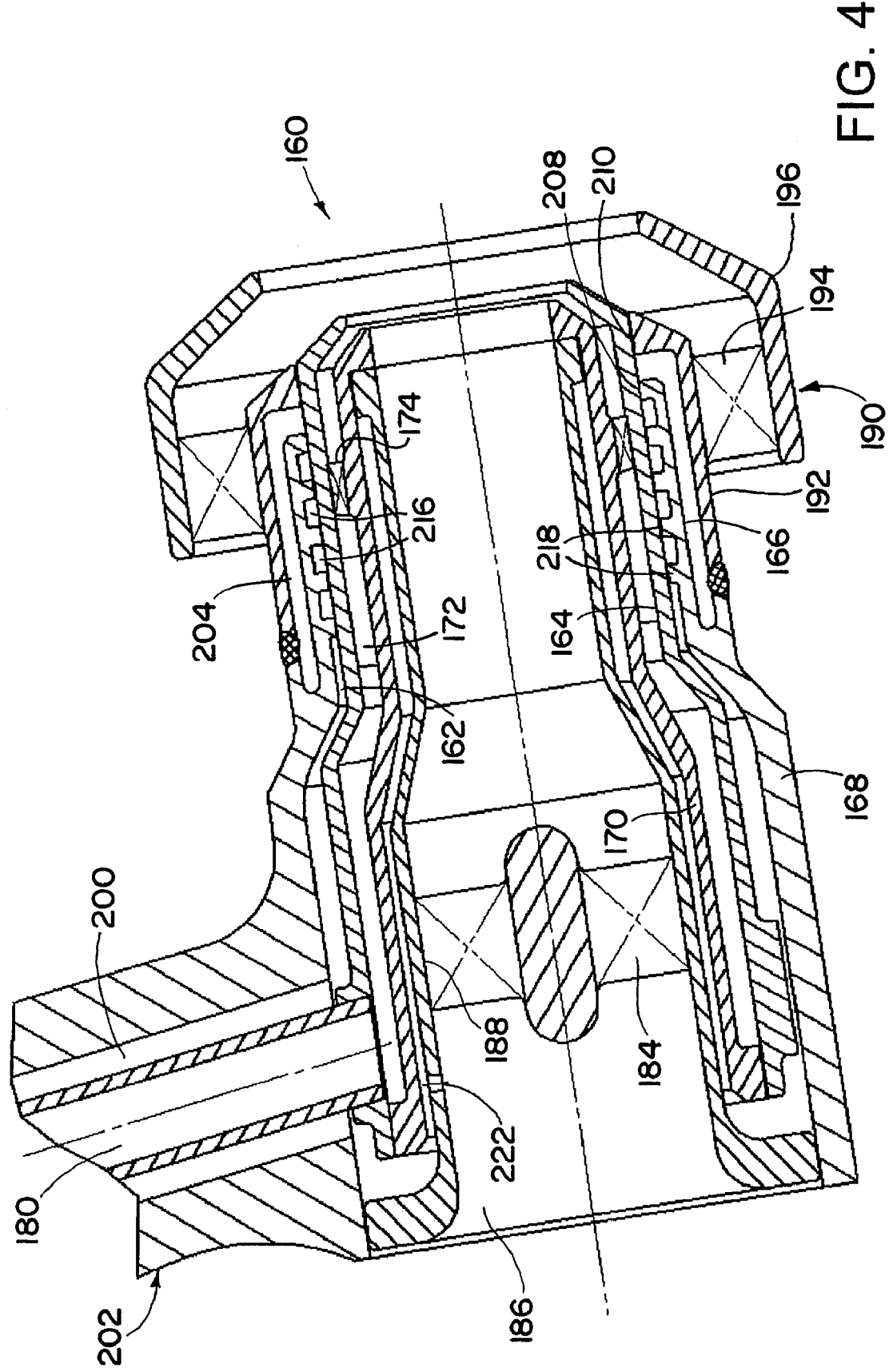
FIG. 4 is a fragmentary cross-sectional view similar to FIG. 2, but showing another configuration.

Turning now to FIG. 4, another nozzle construction according to the invention is shown at 160. In the nozzle 160, an annular insulating gap 162 is provided between an internal prefilmer 164 and a wall 166 formed as part of the shroud 168. The prefilmer 164 forms with a fuel swirler 170 an annular fuel passage 172 that directs fuel through the nozzle. The fuel swirler may be provided with vanes 174 that direct the fuel in a swirling manner as it flows past the vanes. The prefilmer 164 may have a fuel inlet opening at its upstream end, that receives the downstream end of a fuel conduit 180. The fuel conduit 180 and related structure may be as above described in respect of FIGS. 1 and 2.

The prefilmer 164 may be tapered inwardly at its downstream end to direct fuel in a swirling manner toward the central axis "A" at the discharge end of the nozzle. An air swirler 184 may be provided in the central air passage 186 bounded by the radially inner surface of an inner annular heat shield 188 that is disposed radially inwardly of the fuel swirler. In addition, an outer air swirler 190 includes an annular wall 192 that forms a continuation of the shroud and from which swirler vanes 194 may project radially outwardly to an annular shroud 196.

The insulating gap 162 may be in fluid communication with the insulating gap 200 in housing stem 202. The insulating gap 162 provides thermal protection for internal components in thermal contact with the fuel flowing through the nozzle. As seen in FIG. 4, a second insulating gap 204 may be provided radially outwardly of the downstream end of the insulating gap 162 between the shroud wall 166 and the annular wall 192.

In use, the shroud 168 and wall 166 will be in thermal contact with ambient conditions external to the nozzle, such being high temperature gas turbine compressor discharge air that passes around the nozzle. Consequently, the shroud walls will usually expand longitudinally (along the axis A) more than the prefilmer 164 that is in thermal contact with the fuel. To avoid high stresses from being induced in the nozzle, the shroud wall 166 and prefilmer 164 have the upstream ends thereof anchored, i.e. fixed, with respect to one another, while the downstream tip ends thereof may be free to move relative to one another at a close-fitting sliding interface 208 in the longitudinal direction, i.e. along the axis A of the nozzle. In addition, the tip end of the wall 192 may be free to move relative to the tip end of the prefilmer at a close-fitting sliding interface 210. The interface 208 closes the downstream end of the insulating gap 162 while the interface 210 closes the downstream end of the insulating gap 204.

Notwithstanding the close fit at the interface 208, fuel may still pass into the insulating gap formed between the walls. This can result in carbon being formed in the insulating gap, which carbon is not as good an insulator as air. In addition, the carbon may build up to a point where it blocks venting of the insulation gap, which can lead to an accumulation of fuel in the insulation gap. This may possibly lead to diminished nozzle service life.

Figure 9:
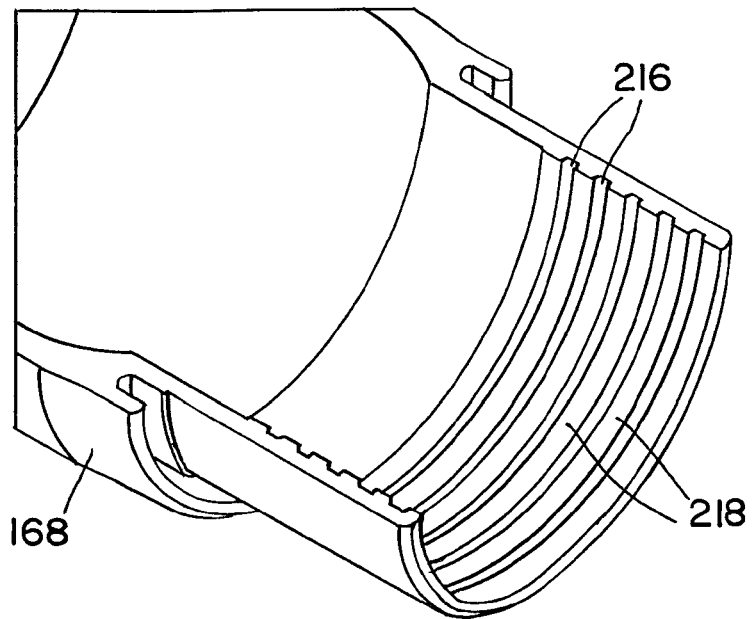
FIG. 9 is a fragmentary perspective view showing another exemplary arrangement of labyrinth grooves and threads on a nozzle housing.

Here, the shroud wall 166 has formed is its radially inner wall surface facing the prefilmer proximate the downstream tip end thereof (i.e. at the interface 208), at least one and preferably a plurality (four shown) of labyrinth grooves 216 that open toward the heat shield for capturing ambient fluid that may enter into the insulating gap 162 through the interface 208. The labyrinth grooves are axially spaced apart by annular threads 218 that engage the radially outer wall surface of the prefilmer with a slip fit. Further details of the labyrinth grooves and threads are shown in FIG. 9, where only the outer shroud is shown.

As before, the labyrinth grooves 216 and threads 218 in effect form a labyrinth seal that performs a sealing action by controlling the passage of fluid through a plurality of chambers formed by the grooves. Fluid can become entrapped in the labyrinth chambers, where it may be forced into a vortex-like motion that acts to prevent its escape and also repel additional fluid from entering.

Additionally (or alternatively), the insulating gap 162 is provided with a positive purge flow for forcing vapors out of the insulating gap. This may be effected by one or more vent openings 222 in the same manner described above in connection with FIG. 2.

Figure 5:
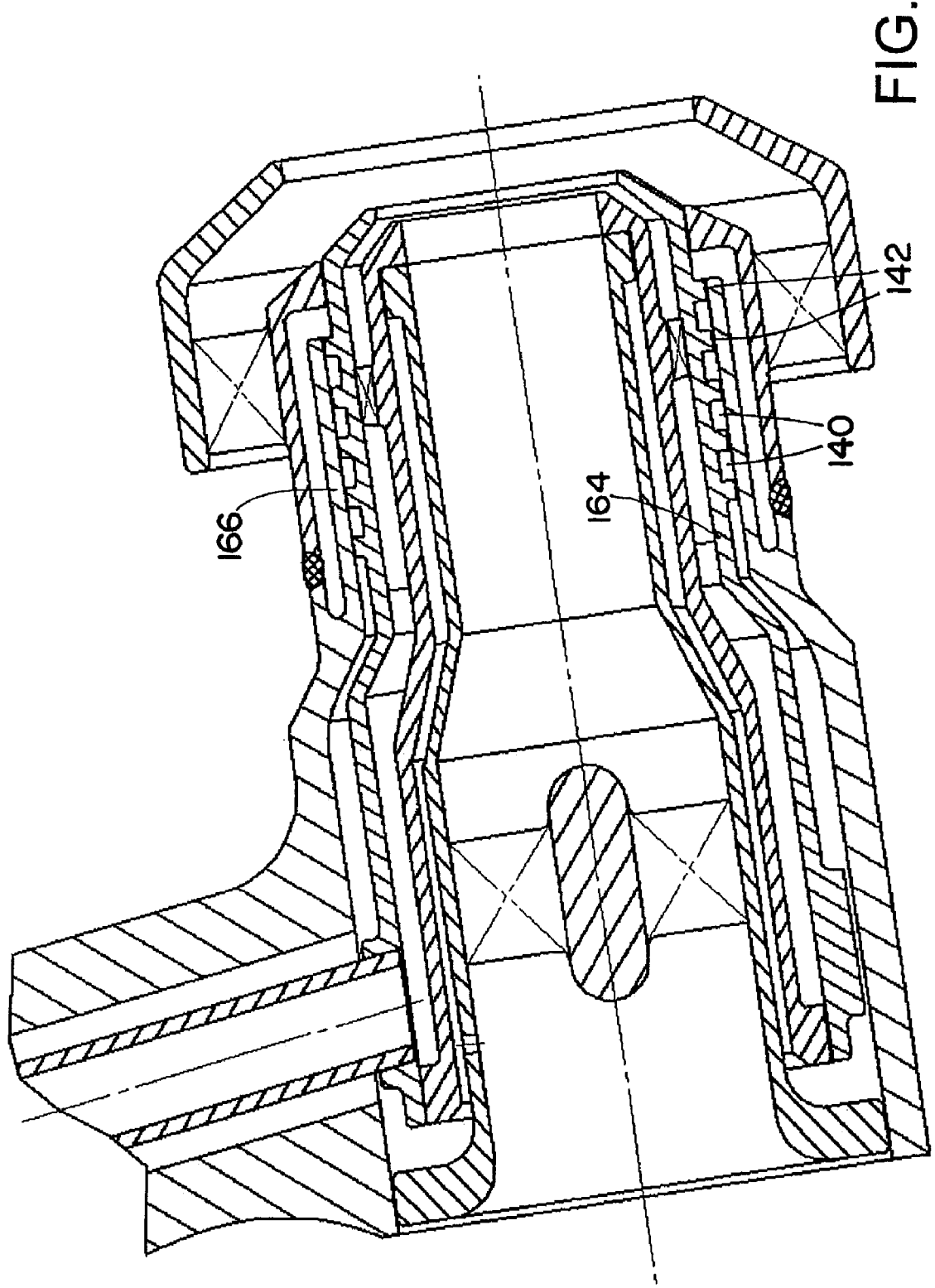
FIG. 5 is a fragmentary cross-sectional view similar to FIG. 2, but showing another configuration.

If desired, the labyrinth grooves 140 and threads 142 additionally or alternatively may be provided on the radially outer surface of the prefilmer 164 as illustrated FIG. 5, wherein the same reference numerals are used to denote like components. In this version of the nozzle, the balance of the structure is otherwise identical to the nozzle shown in FIG. 4.

Figure 6:
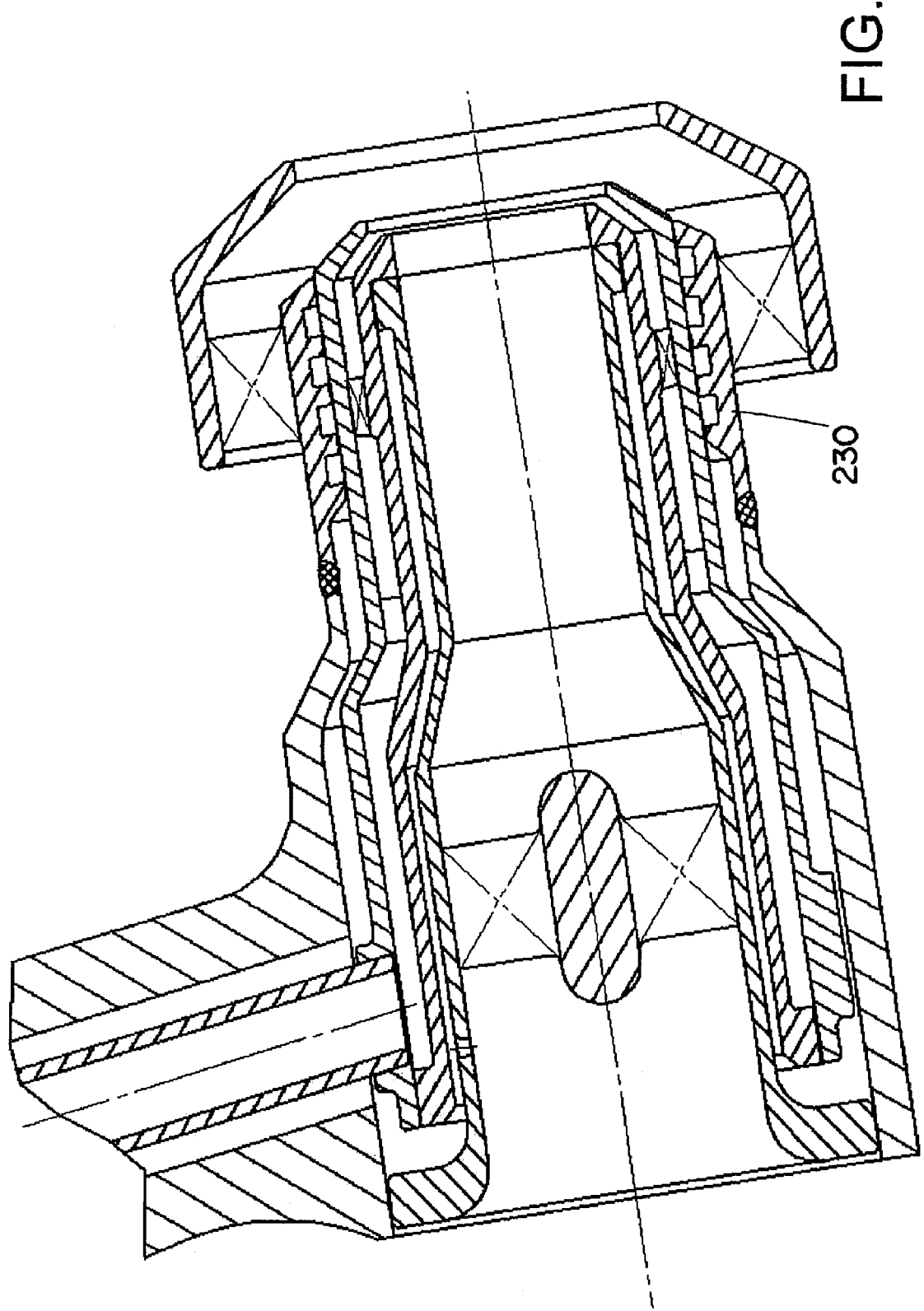
FIG. 6 is a fragmentary cross-sectional view similar to FIG. 2, but showing another configuration.
Figure 7:
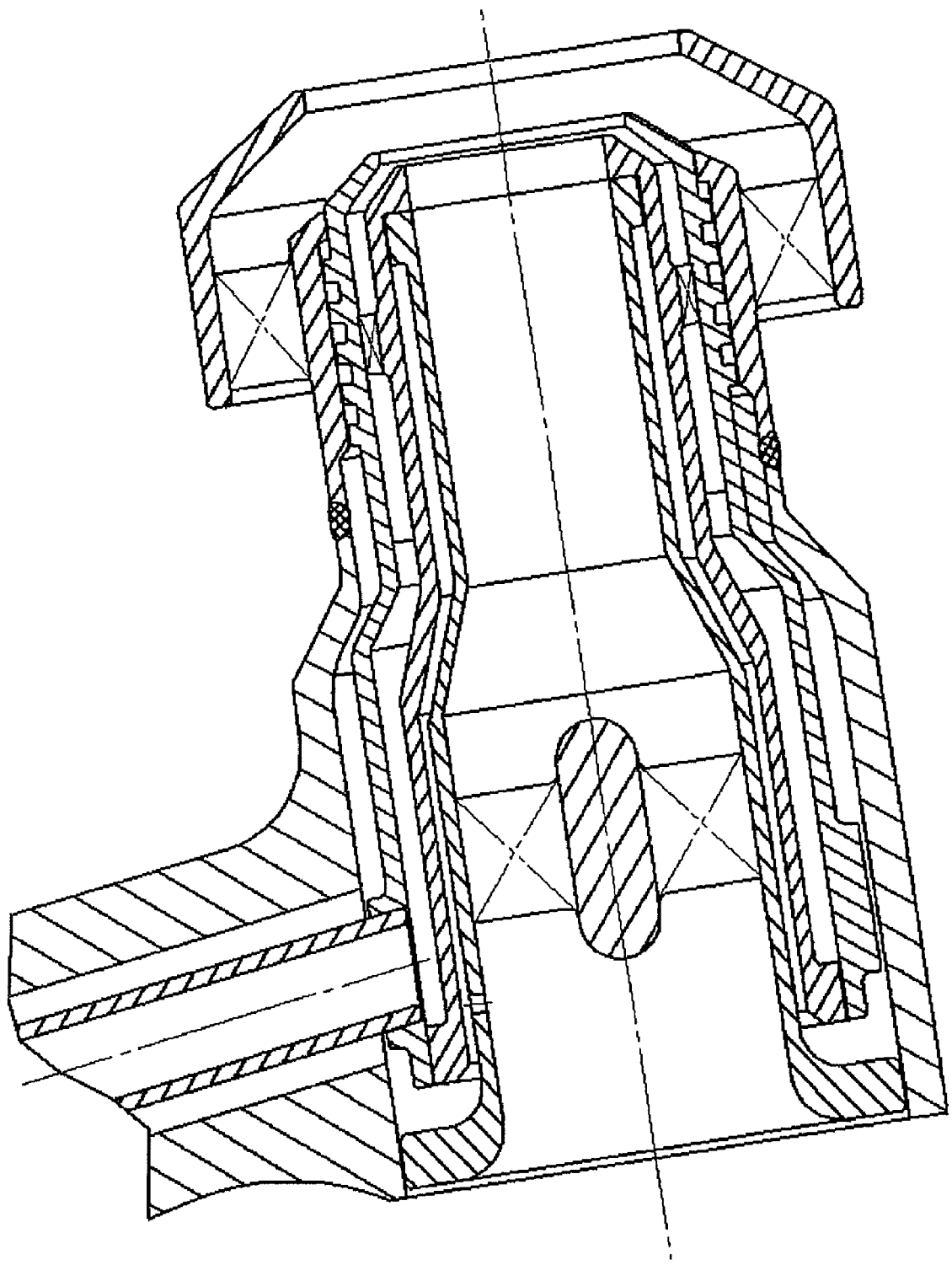
FIG. 7 is a fragmentary cross-sectional view similar to FIG. 2, but showing another configuration.

FIG. 6 shows a further modification where the labyrinth grooves and threads are formed in the radially inner surface of the shroud extension wall 230, whereas FIG. 7 shows the same configuration as FIG. 6, except the labyrinth grooves and threads are formed on the radially outer surface of the prefilmer for interaction with the radially inner surface of the shroud wall. In both instances, purge venting can be provided as above described.

The nozzle described above may be formed from an appropriate heat-resistant and corrosion resistant material, such as those known to those skilled in the art. The nozzle may be formed and assembled using conventional manufacturing techniques.

The skilled person will also appreciate that a nozzle may be provided with one or more of the herein describe insulating gaps and associated labyrinth seals.

Regarding the labyrinth grooves, the same have been described as axially spaced apart, annular grooves. The grooves, however, may be otherwise configured and otherwise shaped. For instance, they may be interconnected, and/or they may be formed by one or more helical grooves as well.

Likewise, other types of venting configurations may be employed. The vent need not be limited to one or more holes as above described, nor necessarily be located at an upstream position. Other configurations can provide for a pressure in the gap higher than the pressure in the labyrinth groove(s). By way of further example, the vent could be provided additionally or alternatively by a slip fit between the upstream end of the inner heat shield 126 and the inner diameter of the shroud 94.

While several embodiments of a nozzle have been described above, it should be apparent to those skilled in the art that other nozzle (and stem) designs can be configured in accordance with the present invention. The invention is not limited to any particular nozzle design, but rather is appropriate for a wide variety of commercially-available nozzles, including nozzles for other applications where the nozzle is subjected to ambient high temperature conditions.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention.

What is claimed is:

1. A nozzle comprising:
   an inlet at an upstream end of the nozzle;
   a discharge outlet at a downstream end of the nozzle;
   a fluid delivery passage extending between the inlet and the discharge outlet;
   an internal annular wall bounding one side of the fluid delivery passage along a length thereof, whereby such wall is in heat transfer relation with fluid passing through the fuel delivery passage;
   an external annular wall interposed between the internal annular wall and ambient conditions, the external and internal walls having downstream tip ends that are relatively longitudinally movable at an interface; and an internal insulating gap interposed between the internal and external walls to insulate the internal wall from ambient temperature conditions external to the nozzle; and wherein one of the internal and external walls has formed therein, proximate the downstream tip ends thereof, at least one labyrinth groove opening toward the other one of the internal and external walls for capturing ambient fluid that may enter into the insulating gap through the interface.

2. A nozzle according to claim 1, including at least one vent opening communicating with the insulating gap at an upstream end of the nozzle for providing a purge flow from the vent opening toward the interface.

3. A nozzle according to claim 2, wherein the internal wall surrounds a central duct extending axially through the nozzle, and the vent opening fluidly connects the central duct to the insulating gap.

4. A nozzle according to claim 1, wherein the fluid delivery passage includes at least one vane configured to impart swirling to the fuel flowing to the discharge outlet.

5. A nozzle according to claim 1, wherein the at least one labyrinth groove includes a plurality of labyrinth grooves that are axially spaced apart by annular threads that engage the other one of the internal and external walls with a slip fit.

6. A nozzle according to claim 1, wherein the insulating gap surrounds the internal wall and the external wall surrounds the insulating gap.

7. A nozzle according to claim 1, wherein the internal wall surrounds the insulating gap, and the insulating gap surrounds a central duct extending axially through the nozzle.

8. A nozzle according to claim 1, wherein the central duct includes air swirl vanes for imparting a rotary motion to the air as the air flows through the central duct.

9. A nozzle according to claim 1, wherein the insulating gap extends substantially the entire length of the fuel delivery passage.

10. A fuel injector for a gas turbine engine comprising a nozzle according to claim 1, and a housing stem for supporting the nozzle in a combustor chamber, the housing stem including an internal fuel conduit for supplying fuel to the inlet of the nozzle.

11. A fuel injector according to claim 10, wherein the housing stem includes an external wall surrounding the fuel conduit, and an insulating gap between the external wall and fuel conduit, which insulating gap is in fluid communication with the insulating gap of the nozzle.

12. A fuel injector according to claim 10, wherein the insulating gap contains air.

13. A fuel injector according to claim 10, wherein the insulating gap is evacuated.

14. A fuel injector according to claim 10, wherein the housing stem extends from a fuel line fitting to the nozzle for connecting the nozzle to the fitting.

15. A fuel injector according to claim 10, wherein the housing stem and nozzle are rigidly and fixedly connected together as a single component that can be inserted into and located within the opening in the combustor casing.

16. A fuel injector according to claim 10, wherein the housing stem includes a flange extending outwardly away from the stem, the flange having an attachment device to allow the stem to be attached to the gas turbine engine.

17. A fuel injector for a gas turbine engine, comprising a housing stem and a nozzle, the nozzle including an internal wall in heat transfer relation with fuel flowing through the nozzle, and an external wall in heat transfer relation with ambient air, the internal and external walls having downstream tip ends that are relatively moveable at an interface due to relative thermal growth during operation of the engine, and an internal insulating gap disposed between the internal and external walls to provide a heat shield for the internal wall, and wherein one of the internal or external wall has formed therein, proximate the downstream tip ends thereof, at least one labyrinth groove for capturing ambient fluid that may enter into the insulating gap through the interface.

18. A fuel injector for a gas turbine engine, the fuel injector comprising:
a fitting having a first fuel passage for receiving fuel;
a nozzle having a second fuel passage for dispensing fuel;
a housing stem extending between and interconnecting said fitting and said nozzle for i) supporting said fuel nozzle, and ii) directing fuel flow from said fitting to said nozzle, said housing stem having an internal bore defined by internal walls extending longitudinally through the stem; and
a fuel conduit disposed in the bore in said housing stem and closely surrounded by the internal walls of said housing stem, said fluid conduit having a first connection with the fitting and a second connection with the nozzle to fluidly interconnect the fuel passage in said fitting with the fuel passage in said nozzle, said internal bore in the housing stem being fluidly closed at the first connection to prevent fuel flowing around the fuel conduit in the bore, said fuel conduit being spaced apart from the internal walls of the housing stem such that an air gap surrounds the fuel conduit along substantially the entire length of the fuel conduit between the fuel conduit and the housing stem;
a vent passage internal of the nozzle, and having a first, upstream end fluidly connected to the air gap, and a second end at a downstream end of the nozzle, the vent passage formed by co-axial cylindrical vent conduits, one residing within the other and a labyrinth groove structure defined between the vent conduits forming at least a portion of the vent passage, and a vent for creating a pressure differential between the upstream end of the vent passage and the downstream end of the vent passage.

19. The fuel injector as in claim 18, wherein the vent is formed in one of the vent conduits.

20. The fuel injector as in claim 18, wherein the labyrinth passage is formed by a helical channel formed in one of the vent conduits.

21. The fuel injector as in claim 18, wherein the vent hole is upstream of the labyrinth groove.

22. The fuel injector as in claim 18, wherein the vent passage is radially inward of the second fuel passage.

23. The fuel injector as in claim 18, wherein the vent passage is radially outward of the second fuel passage.

* * * * *